United States Patent
Kim

(10) Patent No.: US 8,973,047 B2
(45) Date of Patent: Mar. 3, 2015

(54) SIGNAL PROCESSING APPARATUS FOR PRODUCING A PROGRAM INFORMATION TABLE AND A METHOD THEREOF

(75) Inventor: Deok-ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 12/604,969

(22) Filed: Oct. 23, 2009

(65) Prior Publication Data

US 2010/0131984 A1    May 27, 2010

(30) Foreign Application Priority Data

Nov. 21, 2008  (KR) .................. 10-2008-0116515

(51) Int. Cl.
G06F 3/00 (2006.01)
G06F 13/00 (2006.01)
H04N 5/445 (2011.01)
H04N 5/44 (2011.01)
H04N 21/431 (2011.01)
H04N 21/482 (2011.01)
H04N 21/485 (2011.01)

(52) U.S. Cl.
CPC ......... H04N 5/4403 (2013.01); H04N 5/44543 (2013.01); H04N 5/44582 (2013.01); H04N 21/4314 (2013.01); H04N 21/4821 (2013.01); H04N 21/4858 (2013.01); H04N 2005/44556 (2013.01)
USPC ................ 725/47; 725/39; 725/44; 725/45

(58) Field of Classification Search
USPC ................. 725/39, 44, 45, 47, 52, 37, 38, 40
See application file for complete search history.

(56) References Cited

U.S. PATENT DOCUMENTS

| 5,737,029 A | * | 4/1998 | Ohkura et al. | 725/56 |
| 6,347,400 B1 | * | 2/2002 | Ohkura et al. | 725/60 |
| 2003/0146928 A1 | | 8/2003 | Finster et al. | |
| 2003/0184578 A1 | | 10/2003 | Cowperthwaite | |
| 2005/0289593 A1 | * | 12/2005 | Spilo | 725/45 |

(Continued)

FOREIGN PATENT DOCUMENTS

| DE | 10237343 A1 | 3/2004 |
| KR | 1998-032890 A | 7/1998 |

(Continued)

OTHER PUBLICATIONS

Communication from the European Patent Office issued Dec. 17, 2012 in counterpart European Application No. 09176190.8.

(Continued)

*Primary Examiner* — Nnenna Ekpo
(74) *Attorney, Agent, or Firm* — Sughrue Mion, PLLC

(57) ABSTRACT

A broadcast receiving apparatus and a broadcast guiding method are provided. A broadcast receiving apparatus includes a video output unit which outputs a program information table in which broadcast information is arranged using rows and columns according to a plurality of references, an interface unit which enables a user to select at least one of the rows and the columns in the program information table, and a control unit which segments a reference corresponding to the at least one of the rows and the columns selected through the interface unit and reorganizes the program information table according to the segmented reference, and controls the video output unit to output the reorganized program information table.

14 Claims, 6 Drawing Sheets

| Genre ▼ \ CH ▼ | CH 1 | CH 2 | ... | CH n |
|---|---|---|---|---|
| Action | 10 | 0 | ... | 2 |
| Drama | 2 | 5 | ... | 1 |
| ⋮ | ⋮ | ⋮ | ⋮ | ⋮ |
| Sports | 5 | 20 | ... | 10 |

| Genre ▼ \ Featured Performer ▼ | Featured Performer 1 | Featured Performer 2 | ... | Featured Performer n |
|---|---|---|---|---|
| Action + CH1 | 3 | 2 | ... | 1 |
| Drama + CH1 | 2 | 0 | ... | 0 |
| ⋮ | ⋮ | ⋮ | ⋮ | ⋮ |
| Sports | 1 | 3 | ... | 1 |

(56) References Cited

U.S. PATENT DOCUMENTS

2006/0236233 A1 10/2006 Ozawa et al.
2009/0165048 A1* 6/2009 Nishimura ..................... 725/39
2010/0031193 A1* 2/2010 Stark et al. ................... 715/810

FOREIGN PATENT DOCUMENTS

| KR | 2001-0045353 A | 6/2001 |
| KR | 10-2007-0027143 A | 3/2007 |
| WO | 00/16548 A1 | 3/2000 |

OTHER PUBLICATIONS

Communication dated Aug. 11, 2014 issued by the Korean Intellectual Property Office in counterpart Korean Patent Application No. Oct. 2008-0116515.

* cited by examiner

FIG. 3A

| Genre ▼ \ CH ▼ | CH 1 | CH 2 | ... | CH n |
|---|---|---|---|---|
| Action | 10 | 0 | ... | 2 |
| Drama | 2 | 5 | ... | 1 |
| ⋮ | ⋮ | ⋮ | ⋮ | ⋮ |
| Sports | 5 | 20 | ... | 10 |

FIG. 3B

| Genre ▼ \ Featured Performer ▼ | Featured Performer 1 | Featured Performer 2 | ... | Featured Performer n |
|---|---|---|---|---|
| Action + CH1 | 3 | 2 | ... | 1 |
| Drama + CH1 | 2 | 0 | ... | 0 |
| ⋮ | ⋮ | ⋮ | ⋮ | ⋮ |
| Sports | 1 | 3 | ... | 1 |

FIG. 3C

| Featured Performer ▼ \ CH ▼ | CH 1 + Action | CH 2 + Action | ⋯ | CH n + Action |
|---|---|---|---|---|
| Featured Performer 1 | 3 | 0 | ⋯ | 0 |
| Featured Performer 2 | 5 | 0 | ⋯ | 1 |
| ⋮ | ⋮ | ⋮ | ⋮ | ⋮ |
| Featured Performer n | 0 | 0 | ⋯ | 1 |

FIG. 3D

| Action ▼ \ Featured Performer ▼ | Featured Performer 1 | Featured Performer 2 | ⋯ | Featured Performer n |
|---|---|---|---|---|
| Action + CH1 | 3 | 2 | ⋯ | 5 |

FIG. 3E

| Title of Program | CH 1 + Action |
|---|---|
| Program 1 | Broadcasting time + Produced year + Keyword + The number of broadcasting |
| Program 2 | |
| ⋮ | |
| Program 10 | |

FIG. 4A

| | Baseball | Basketball | Soccer | .... | Volleyball |
|---|---|---|---|---|---|
| Sports + CH 1 | 2 | 1 | 1 | .... | 0 |

FIG. 4B

| Sports \ CH ▼ | CH 1 | CH 2 | ... | CH n |
|---|---|---|---|---|
| Baseball | 2 | 3 | ... | 3 |
| Basketball | 1 | 2 | ... | 2 |
| Soccer | 1 | 2 | ... | 1 |
| ⋮ | ⋮ | ⋮ | ⋮ | ⋮ |
| Volleyball | 0 | 2 | ... | 1 |

FIG. 5

| Genre ▼ \ CH ▼ | CH 1 | CH 2 | ... | CH n |
|---|---|---|---|---|
| Action | 1.Program,Time<br>⋮<br>10.Program,Time | | ... | 1.Program,Time<br>2.Program,Time |
| Drama | 1.Program,Time<br>2.Program,Time | 1.Program,Time<br>⋮<br>5.Program,Time | ... | 1.Program,Time |
| ⋮ | ⋮ | ⋮ | ⋮ | ⋮ |
| Sports | 1.Program,Time<br>⋮<br>5.Program,Time | 1.Program,Time<br>⋮<br>20.Program,Time | ... | 1.Program,Time<br>⋮<br>10.Program,Time |

SIGNAL PROCESSING APPARATUS FOR PRODUCING A PROGRAM INFORMATION TABLE AND A METHOD THEREOF

CROSS-REFERENCE TO RELATED APPLICATIONS

This application claims priority from Korean Patent Application No. 10-2008-0116515, filed on Nov. 21, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a broadcast receiving apparatus and a broadcast guiding method, and more particularly, to a broadcast receiving apparatus which provides a broadcast guide program to independently select content constituting ranks and columns in an electronic program guide, and a broadcast guiding method.

2. Description of the Related Art

Broadcast receiving apparatuses are apparatuses for receiving digital satellite broadcasts, and converts digital broadcasts or analog broadcasts transmitted from video signals, or audio signals input through diverse external devices (such as video players and digital versatile disk (DVD) players) into transport stream (TS) signals, and transmits the TS signals to display apparatuses. Representative examples of the broadcast receiving apparatus are digital televisions, Internet Protocol Television (IPTV) such as video on demand (VOD), and set-top boxes.

Recently, broadcast receiving apparatuses have been developing rapidly, and thus have been providing a large number of programs. In addition, as digital IPTV broadcasts are widespread, the number of channels increase, and thus the amount of electronic program guide (EPG) information also increases.

However, related art broadcast receiving apparatuses provide an EPG regarding hundreds of programs in a table format based on the time and channel.

Accordingly, as broadcast channels and broadcast programs are increased, it is more difficult for a user to search for a desired broadcast program from among a plurality of broadcast programs using only an EPG provided by the broadcast receiving apparatus.

Therefore, there is a need for methods for the user to select a desired broadcast program more easily.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a broadcast receiving apparatus which enables a user to easily search for a desired broadcast program although the number of broadcasting stations, channels, and broadcast programs is increasing, and a broadcast guiding method thereof.

According to an exemplary aspect of the present invention, there is provided a broadcast receiving apparatus including a video output unit which outputs a program information table in which broadcast information is arranged using rows and columns according to a plurality of references, an interface unit which enables a user to select at least one of the rows and the columns in the program information table, and a control unit which segments a reference corresponding to the at least one of the rows and the columns selected through the interface unit and reorganizes the program information table according to the segmented reference, and controls the video output unit to output the reorganized program information table.

The control unit may repeatedly segment the reference according to a number of user selections and controls the video output unit to output the detailed broadcast information according to the segmented reference.

If a row or a column in the program information table is selected, the control unit may segment the broadcast information according to a reference corresponding to the selected row or column.

If a field corresponding to a row and a column is selected from among a plurality of fields in the program information table, the control unit may segment broadcast information corresponding to the selected field according to a reference corresponding to the row and the column which is selected by the user.

The reference may include at least one of a channel, a featured performer, a broadcasting station, a time, a genre, a keyword, and a produced year.

The program information table may be an electronic program guide (EPG).

According to another exemplary aspect of the present invention, there is provided a broadcast guiding method including displaying a program information table in which broadcast information is arranged using rows and columns according to a plurality of references, if at least one of the rows and the columns in the program information table is selected by a user, segmenting a reference corresponding to the selected at least one of the rows and the columns, and reorganizing the program information table according to the segmented reference.

The segmenting operation and the reorganizing operation may be repeatedly performed according to a number of user selections.

In the segmenting operation, if a row or a column in the program information table is selected by the user, the broadcast information may be segmented according to a reference corresponding to the selected row or column.

In the segmenting operation, if a field corresponding to a row and a column is selected from among a plurality of fields in the program information table by the user, broadcast information corresponding to the selected field may be segmented according to a reference corresponding to the row and the column which is selected by the user.

The reference may include at least one of a channel, a featured performer, a broadcasting station, a time, a genre, a keyword, and a produced year.

The program information table may be an electronic program guide (EPG).

According to another exemplary aspect of the present invention, there is provided a broadcast receiving apparatus including a video output unit which provides a program information table in which broadcast information is arranged using rows and columns according to a plurality of references, and outputs a program information table in which the broadcast information is rearranged using rows and columns according to a sub-reference, an interface unit which enables a user to select at least one of the rows and the columns in the program information table, and a control unit which segments the broadcast information according to a reference corresponding to the at least one of the rows and the columns selected through the interface unit or according to the sub-reference and reorganizes the program information table based on the segmented broadcast information, and controls the video output unit to output the reorganized program information table.

The sub-reference may be a preset subcategory corresponding to each of the plurality of references.

The control unit may classify the broadcast information according to a sub-reference of the at least one of the rows and the columns selected through the interface unit, and control the video output unit to output the program information table which is reorganized according to the sub-reference.

BRIEF DESCRIPTION OF THE DRAWINGS

The above and/or other aspects of the present invention will be more apparent by describing certain exemplary embodiments of the present invention with reference to the accompanying drawings, in which:

FIGS. 3A to 3E illustrate examples of an EPG providing broadcast information which is rearranged according to a plurality of categories using a broadcast receiving apparatus according to an exemplary embodiment of the present invention;

FIGS. 4A to 4B illustrate examples of an EPG providing broadcast information which is rearranged according to a lower category using a broadcast receiving apparatus according to an exemplary embodiment of the present invention; and FIG. 5 illustrates another type of an EPG provided by a broadcast receiving apparatus according to an exemplary embodiment of the present invention.

DETAILED DESCRIPTION OF EXEMPLARY EMBODIMENTS OF THE INVENTION

Figure 1:
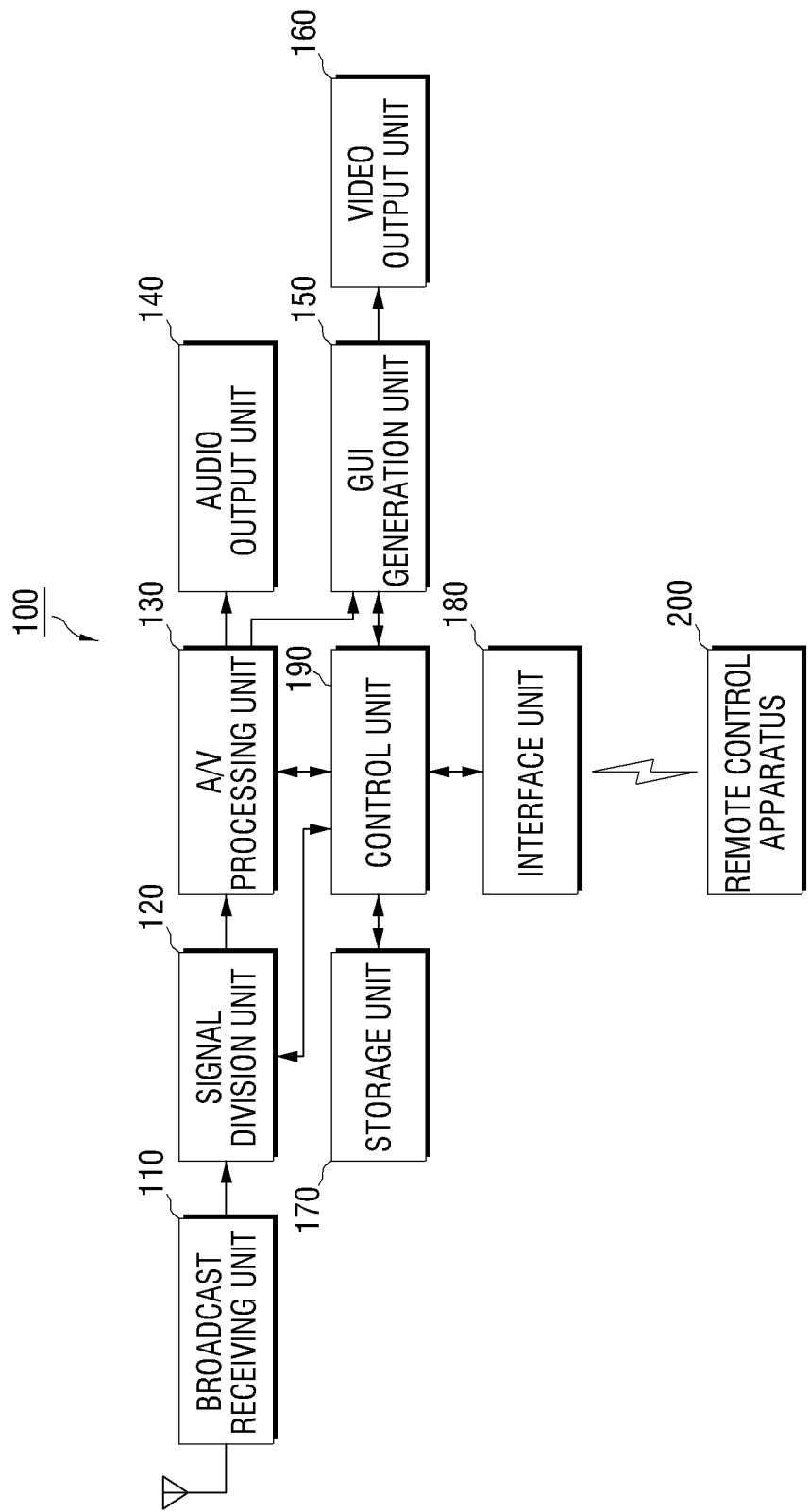
FIG. 1 is a schematic block diagram of a broadcast receiving apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of a broadcast receiving apparatus according to an exemplary embodiment of the present invention. For convenience of description, an electronic program guide (EPG) in the exemplary embodiment of the present invention is limited to a program information table in which broadcast information is arranged using ranks and columns according to a plurality of categories.

Referring to FIG. 1, the broadcast receiving apparatus may include a broadcast receiving unit 110, a signal division unit 120, an audio/video (A/V) processing unit 130, an audio output unit 140, a graphical user interface (GUI) generation unit 150, a video output unit 160, a storage unit 170, an interface unit 180, and a control unit 190.

The broadcast receiving unit 110 receives a broadcast from a broadcasting station or a satellite wirelessly or via a wire, and modulates the broadcast. A broadcast signal received by the broadcast receiving unit 110 include the Program and System Information Protocol (PSIP), and the PSIP includes EPG information.

The signal division unit 120 divides a broadcast signal into a video signal, an audio signal, and an additional information signal, transmits the video signal and the audio signal to the A/V processing unit 130, and transmits the additional information signal to the control unit 190.

The A/V processing unit 130 performs signal-processing, such as video decoding, video scaling, and audio decoding, of the video signal and the audio signal input from the broadcast receiving unit 110 and the control unit 190. The A/V processing unit 130 outputs the video signal to the GUI generation unit 150, and outputs the audio signal to the audio output unit 140.

If the video signal and the audio signal are stored in the storage unit 170, the A/V processing unit 130 stores the video signal and audio signal of a compressed format in the storage unit 170.

The audio output unit 140 outputs the audio signal output by the A/V processing unit 130 using a speaker (not shown) or using an external device which is connected via an external output terminal (not shown).

The GUI generation unit 150 generates a graphical user interface (GUI) for a user, and adds the GUI to an image output from the A/V processing unit 130. In addition, the GUI generation unit 150 generates a GUI for an EPG using EPG information received from the control unit 190.

The video output unit 160 displays an image output from the A/V processing unit 130 on a display unit, or outputs the image to an external device (for example, an external display device) which is connected via an external output terminal (not shown). In addition, the video output unit 160 outputs the GUI for the EPG generated by the GUI generation unit 150 to the display unit. The EPG is displayed so that broadcast information is arranged using rows and columns.

The storage unit 170 stores a recorded file of a broadcast program received by the broadcast receiving unit 110 and EPG information. The EPG information is collection of information regarding a plurality of programs classified according to categories. The categories are references to constitute the EPG, and may include the channel, the broadcasting station, the time, the featured performer, the program title, the produced year, and the keyword. An example of a keyword may be a plot of a program.

The storage unit 170 may be implemented as a hard disk or a non-volatile memory.

The control unit 190 determines a user command based on the user's manipulation received from a remote control apparatus 200 through the interface unit 180, and controls the overall operation of the broadcast receiving apparatus 100 according to the user command. The remote control apparatus 200 may be a remote control or a pointing device.

More specifically, if a user command to segment a row or a column from the remote control apparatus 200 is received, the control unit 190 reads out EPG information corresponding to the segmentation command from the storage unit 170, and controls the GUI generation unit 150 and the video output unit 160 to display the EPG information. The segmentation command indicates that an EPG for broadcast information, that is, the EPG information is rearranged according to a category selected by the user. The segmentation command includes the category selected by the user.

The control unit 190 can receives a command to segment both a row and a column from the remote control apparatus 200, and controls the GUI generation unit 150 and the video output unit 160 to read out EPG information corresponding to the segmentation command from the storage unit 170 and display the read-out EPG information.

In addition, the control unit 190 can receive a field segmentation command to segment fields corresponding to a row and a column from the remote control apparatus 200. The operation of displaying EPG information corresponding to the field segmentation command is the same as the operation of segmenting a row or a column, so detailed description is omitted here.

If the control unit 190 receives a segmentation command from the remote control apparatus 200, the control unit 190 controls the GUI generation unit 150 and the video output unit 160 to generate an EPG which is generated by rearranging using a preset sub-reference broadcast information rearranged using a reference of a row or a column which is selected by the user, and display the generated EPG. The reference may be a category, and the sub-reference may be a subcategory. The segmentation command is a command to segment a category corresponding to a row or a column which is selected by the user using subcategories, and is input by the user.

For example, referring to FIGS. 3A and 4A, if broadcast information corresponding to channel 1 (CH1) and sports which are selected by the user is classified according to sub-references of sports, the control unit 190 reorganizes an EPG with reference to the storage unit 170 by classifying sports according to preset sub-references such as baseball, basketball, soccer, and volleyball.

In the same manner, the control unit 190 can control the GUI generation unit 150 and the video output unit 160 to reorganize an EPG by classifying sports from among the genres of a plurality of channels in FIG. 3A according to sub-references, and provide the user with the reorganized EPG. That is, the control unit 190 provides an EPG including broadcast information rearranged according to sub-references after row segmentation as illustrated in FIG. 4B.

If a detailed view command is received from the remote control apparatus 200, the control unit 190 reads out EPG information corresponding to a selected field from the storage unit 170 and controls the GUI generation unit 150 and the video output unit 160 to display the read-out EPG information. The detailed view command is a command to provide the user with broadcast information regarding a field corresponding to a row and a column which are selected by the user.

Detailed description of reorganizing and displaying an EPG according to a reference selected by the user from among the categories when a segmentation command is received from the remote control apparatus 200 is given below with reference to FIG. 2.

Figure 2:
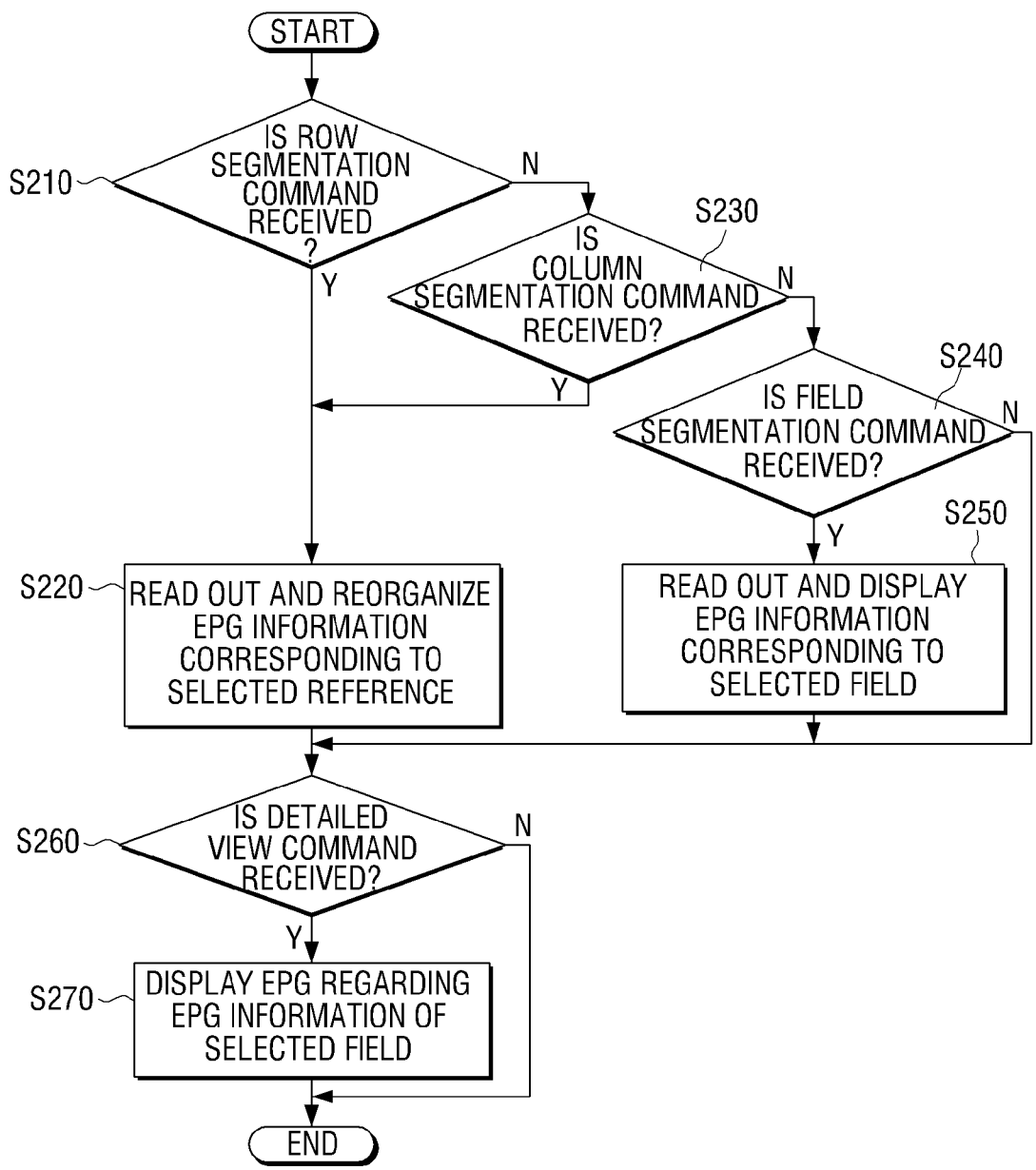
FIG. 2 is a flow chart illustrating a method for operating a broadcast receiving apparatus according to an exemplary embodiment of the present invention.

FIG. 2 is a flow chart illustrating a method for operating the broadcast receiving apparatus 100 according to an exemplary embodiment of the present invention. FIGS. 3A to 3E illustrate examples of an EPG to be provided according to selected categories.

Referring to FIGS. 2 and 3A to 3E, the user selects channel and genre as categories so that columns are classified according to channels (CH1, CH2, . . . , and CHn) and rows are classified according to genres. Accordingly, an EPG based on the channel and genre is displayed. Segmenting broadcast information regarding action from among the genres according to a featured performer is described as an example. As illustrated in FIG. 3A, if the user selects action using the remote control apparatus 200, a row regarding action is selected, and if the user selects channel 1 (CH1) using the remote control apparatus 200, a column regarding CH1 is selected.

Firstly, if the row regarding action is selected and a row segmentation command is received from the remote control apparatus 200 (S210:Y), the control unit 190 reads out EPG information corresponding to a category contained in the row segmentation command from the storage unit 170 and reorganizes the EPG information (S220).

More specifically, referring to FIGS. 3A and 3C, if a row segmentation command to segment action according to featured performers is received, the control unit 190 reorganizes an EPG by segmenting broadcast programs of each channel of which genre are action according to featured performers with reference to the storage unit 170. That is, the control unit 190 reorganizes an EPG by segmenting a row (R) indicating action according to featured performers. A category contained in the row segmentation command is featured performers, and the user can select the featured performers using the remote control apparatus 200.

Subsequently, the control unit 190 controls the GUI generation unit 150 and the video output unit 160 to display the reorganized EPG.

If a row segmentation command is not received in operation 210 and a column segmentation command is received (5230;Y), the control unit 190 reorganizes an EPG by reading out EPG information corresponding to a category contained in the column segmentation command from the storage unit 170.

More specifically, referring to FIGS. 3A and 3B, if a column segmentation command to segment channel 1 (CH1) according to featured performers is received, the control unit 190 reorganizes an EPG by segmenting broadcast programs provided via channel 1 (CH1) according to the genre and featured performers with reference to the storage unit 170. That is, the control unit 190 reorganizes an EPG by segmenting a column (C) indicating channel 1 (CH1) according to featured performers. A reference contained in the column segmentation command is featured performers, and the user can select the featured performers using the remote control apparatus 200.

If a column segmentation command is not received in operation 230 and a field segmentation command is received (S240;Y), the control unit 190 reorganizes an EPG by reading out EPG information corresponding to a reference contained in the field segmentation command from the storage unit 170 and displays the reorganized EPG (S250).

More specifically, referring to FIGS. 3A and 3D, if a field (F) corresponding to channel 1 (CH1) and action is selected by the user and a field segmentation command to segment the selected field (F) according to featured performers is received, the control unit 190 reorganizes an EPG by segmenting broadcast programs provided via channel 1 (CH1) of which genre are action according to featured performers with reference to the storage unit 170. A category contained in the field segmentation command is featured performers, and the user can select the featured performers using the remote control apparatus 200.

Subsequently, the control unit 190 controls the GUI generation unit 150 and the video output unit 160 to display the reorganized EPG.

If a detailed view command to view a field (F) selected by the user is receive after the EPG is displayed by segmenting a row, a column, or a field (S260:Y), the control unit 190 reads out detailed information corresponding to the selected field (F) from the storage unit 170 and displays an reorganized EPG (S270). The detailed information is included in the EPG information.

More specifically, referring to FIGS. 3A and 3E, if the user inputs a detailed view command using the remote control apparatus 200, the control unit 190 reorganizes an EPG by reading out detailed information regarding 10 broadcast programs provided via channel 1 (CH1) of which genre are action from the storage unit 170. Subsequently, the control unit 190 controls the GUI generation unit 150 and the video output unit 160 to display the reorganized EPG as illustrated in FIG. 3E.

If a detailed view command to view featured performer 1 in more detail is received after the field is segmented as illustrated in FIG. 3D, the control unit 190 reorganizes an EPG by reading out detailed information regarding 3 broadcast programs, which is provided via channel 1, of which genre are action, and in which Featured performer 1 appears, from the storage unit 170. That is, Featured performer 1 is added to the horizontal table of the broadcast information table provided as illustrated in FIG. 3E.

In FIG. 2, an EPG is reorganized according to a detailed view command after row, column, or field segmentation is performed, but operations S260 and S270 may precede operation S210. That is, the control unit 190 may reorganize an EPG so as to directly provide the user with detailed information regarding broadcast programs corresponding to a field selected by the user after an initial EPG is displayed.

In the broadcast receiving apparatus according to the exemplary embodiment of the present invention, an EPG provided after a row and a column are selected provides broadcast information regarding the number of broadcast programs as illustrated in FIGS. 3A to 3D, but is not limited thereto. As illustrated in FIG. 5, the EPG may provide broadcast information regarding the title and broadcasting time of broadcast programs.

The user inputs user commands to segment broadcast information to the broadcast receiving apparatus according to the exemplary embodiment of the present invention using the remote control apparatus 200, but may input user commands using a key manipulation unit, a touch screen, a touch pad, or a mouse provided in the broadcast receiving apparatus.

In the broadcast receiving apparatus according to the exemplary embodiment of the present invention, broadcast information is provided to the user through an EPG. However, an EPG is merely an example of a program information table to provide the user with broadcast information.

In the broadcast receiving apparatus according to the exemplary embodiment of the present invention, broadcast programs are segmented once according to a plurality of references, but the number of segmentation is not limited thereto. After segmentation, broadcast programs can be repeatedly segmented according to a selected reference.

The broadcast receiving apparatus according to the exemplary embodiment of the present invention outputs an EPG providing broadcast information which is rearranged by classifying according to a sub-reference after segmenting a field and a column. However, broadcast information may be classified according to a sub-reference after segmenting a row.

In the broadcast receiving apparatus according to the exemplary embodiment of the present invention, a row, a column, or a field of broadcast information is segmented according to each featured performer. However, featured performers can be segmented according to sub-references such as a singer, a comedian, a sports featured performer, an announcer, an actor, and an entertainer.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus, comprising:
a video output which outputs a program information table in which broadcast information is arranged using rows and columns according to a plurality of references;
an interface which enables a user to select at least one of the rows and the columns in the program information table; and
a controller which segments a reference corresponding to the at least one of the rows and the columns selected through the interface and reorganizes the program information table according to the segmented reference, and controls the video output to output the reorganized program information table,
wherein the controller repeatedly segments the reference according to a number of user selections and controls the video output to output detailed broadcast information according to the repeatedly segmented reference, and
wherein the references labeling the rows and the columns of the program information table are changed to sub-references dividing the reference corresponding to the at least one of the selected rows and columns into sub-categories according to the user's repeated selection of the references and the sub-references, the sub-references being displayed as a plurality of new rows and new columns displayed in place of the rows and the columns, respectively.

2. The broadcast receiving apparatus according to claim 1, wherein if a row or a column in the program information table is selected, the controller segments the broadcast information according to a reference corresponding to the selected row or column.

3. The broadcast receiving apparatus according to claim 1, wherein if a field corresponding to a row and a column is selected from among a plurality of fields in the program information table, the controller segments broadcast information corresponding to the selected field according to a reference corresponding to the row and the column which is selected by the user.

4. The broadcast receiving apparatus according to claim 1, wherein the reference includes at least one of a channel, a featured performer, a broadcasting station, a time, a genre, a keyword, and a produced year.

5. The broadcast receiving apparatus according to claim 1, wherein the program information table is an electronic program guide (EPG).

6. A broadcast guiding method, comprising:
displaying, using a processor, a program information table in which broadcast information is arranged using rows and columns according to a plurality of references;
if at least one of the rows and the columns in the program information table is selected by a user, segmenting a reference corresponding to the selected at least one of the rows and the columns; and
reorganizing the program information table according to the segmented reference,
wherein the segmenting and the reorganizing are repeatedly performed according to a number of user selections, and wherein the references labeling the rows and the columns of the program information table are changed to sub-references dividing the reference corresponding to the at least one of the selected rows and columns into sub-categories according to the user's repeated selection of the references and the sub-references, the sub-references being displayed as a plurality of new rows and new columns displayed in place of the rows and the columns, respectively.

7. The broadcast guiding method according to claim 6, wherein in the segmenting, if a row or a column in the program information table is selected by the user, the broadcast information is segmented according to a reference corresponding to the selected row or column.

8. The broadcast guiding method according to claim 6, wherein in the segmenting, if a field corresponding to a row and a column is selected from among a plurality of fields in the program information table by the user, broadcast information corresponding to the selected field is segmented according to a reference corresponding to the row and the column which is selected by the user.

9. The broadcast guiding method according to claim 6, wherein the reference includes at least one of a channel, a featured performer, a broadcasting station, a time, a genre, a keyword, and a produced year.

10. The broadcast guiding method according to claim 6, wherein the program information table is an electronic program guide (EPG).

11. A broadcast receiving apparatus comprising:
a graphical user interface which generates a graphical user interface (GUI);
a memory which stores electronic program guide (EPG) information; and
a controller which reads selected EPG information from the memory, arranges the selected EPG information based on row categories and column categories selected by a user through a user interface, and controls a display device to display the EPG information as the GUI,
wherein the controller repeatedly segments a reference according to a number of user selections and controls a video output to output detailed broadcast information according to the repeatedly segmented reference, and
wherein row categories and column categories labeling rows and columns of the EPG information are changed to sub-categories corresponding to the selected row categories and column categories according to the user's repeated selection of the row categories, the column categories and the sub-categories, the sub-categories being displayed as a plurality of new row categories and new column categories displayed in place of the row categories and the column categories, respectively.

12. A broadcast guiding method comprising:
selecting, using a processor, a first category of electronic program guide (EPG) information, which is defined as a row;
selecting a second category of EPG information, which is defined as a column; and
generating a graphical user interface (GUI) based on the rows determined by the selected first category and the columns determined by the selected second category,
wherein a segmenting operation and a reorganizing operation are repeatedly performed according to a number of times a user performs the selecting, and
wherein row categories and column categories labeling the rows and columns of the EPG information are changed to sub-categories corresponding to the selected row categories and column categories according to the user's repeated selection of the row categories, the column categories and the sub-categories, the sub-categories being displayed as a plurality of new row categories and new column categories displayed in place of the row categories and the column categories, respectively.

13. The broadcast receiving apparatus according to claim 1, wherein the program information table includes broadcast information regarding a number of broadcast programs relating to the selected at least one row and column.

14. The broadcast receiving apparatus according to claim 13, wherein when the broadcast information regarding the number of broadcast programs is selected, broadcast information regarding a title and broadcasting time of the broadcast programs is displayed.

\* \* \* \* \*